United States Patent
Ryu

(10) Patent No.: US 8,600,218 B2
(45) Date of Patent: Dec. 3, 2013

(54) VIDEO INFORMATION PLAYBACK METHOD AND VIDEO INFORMATION PLAYBACK APPARATUS

(75) Inventor: Tomoaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 13/266,217

(22) PCT Filed: May 24, 2010

(86) PCT No.: PCT/JP2010/003465
§ 371 (c)(1),
(2), (4) Date: Oct. 25, 2011

(87) PCT Pub. No.: WO2010/137281
PCT Pub. Date: Dec. 2, 2010

(65) Prior Publication Data
US 2012/0057849 A1     Mar. 8, 2012

(30) Foreign Application Priority Data

May 26, 2009   (JP) ................................. 2009-126569

(51) Int. Cl.
*H04N 9/80*   (2006.01)
(52) U.S. Cl.
USPC .......................................................... 386/248
(58) Field of Classification Search
None
See application file for complete search history.

(56) References Cited

U.S. PATENT DOCUMENTS

| 2008/0292270 A1 | 11/2008 | Ikeda |
| 2010/0260489 A1 | 10/2010 | Okada et al. |
| 2011/0122740 A1* | 5/2011 | Kawakami et al. ........ 369/30.04 |

FOREIGN PATENT DOCUMENTS

| JP | 3837427 B2 | 10/2006 |
| JP | 2010-33628 A | 2/2010 |
| JP | 2010-86641 A | 4/2010 |
| WO | WO 2004/025651 A1 | 3/2004 |
| WO | WO 2006/082892 A1 | 8/2006 |

* cited by examiner

*Primary Examiner* — William C Vaughn, Jr.
*Assistant Examiner* — Daniel Tekle
(74) *Attorney, Agent, or Firm* — Birch, Stewart, Kolasch & Birch, LLP

(57) ABSTRACT

A video information playback method of playing back a recording medium on which a virtual-machine-using content whose video playback can be controlled by a program running in a virtual machine is recorded, including: performing simple resume playback for restarting playback of a main-program video of the virtual-machine-using content without activating the program, when the playback of the main-program video is interrupted and then a playback restart instruction is given; and skipping playback of predetermined video which is to be played back until a menu screen is displayed, when the simple resume playback of the main-program video is finished and then playback from an initial state is performed with activating the program.

4 Claims, 12 Drawing Sheets

```
xxx.plst(){
    number_of_stream
    for(stream_id=0; stream_id < number_of_stream;stream_id++){
        stream_file_name;
        in_time;
        out_time;
    }
}
```

```
zzz.clip(){
        stream_info();
        index_info(){
                number_of_GOP;
                for(GOP_id=0; GOP_id < number_of_GOP;GOP_id++){
                        start_PTS;
                        relative_byte;
                }
        }
}
```

```
Movie.title(){
    number_of_title
    for(title_id=0; title_id < number_of_title;title_id++){
        title_type;
        title_attribute;
        if(title_type == 1){
            JAR_file_name;
        }
        else{
            PlayListL_file_name;
        }
    }
    next_title_id;
}
```

FIG. 8

```
package testappli;

import java.awt.Graphics;
import java.awt.Image;
    .
    .
import org.disc.net.DiscLocator;
    .
```
T1

```
public class Test implements Xlet {
        private TimerITask timer_tsk = null;
        private DiscLocator discLocator = null;
            .
            .
            .
        private int iPlayListID = 0;

private final int XPOS = 256;
        private final int YPOS = 256;

private final int LPOS[][] = {
                    {0,   0, 128, 128},
                    {0, 128, 128, 256},

```
Public void startXlet() throws XletStateChangeException {
    scene = HSceneFactory.getInstance().getDefaultHScene();
    scene.setVisible(true);
    gr = scene.getGraphics();
    try{
        ClassLoader classLoader = getClass().getClassLoader();
        Toolkit toolkit = Toolkit.getDeffaultToolkit();
        mediaTracker = new MediaTracker(scene);
        int index = 0;
        URL    urikey = classLoader.getResource(test.img.png);
        decode_img = toolkit.getImage(urikey);
        mediaTracker.addImage(decode_img,index);
        mediaTracker.waitForAll();
    }
    catch(Exception e){}                                              ⎬ T3 try{
        iPlaylist = 0;
        discLocator = new DiscLocator(iPlayListID);
        mediaLocator = new MediaLocator(discLocator);
        player = Manager.createPlayer(mediaLocator);
        player.perfectch();
        player.start();
    } catch(Exception e){}
    while(true){
        try{
            wait(100);
        }catch(Exception e){}
        if(player.getMediaTime().getSeconds() > 5.0f)break;
    }                                                                 ⎬ T4 try{
        iPlaylist = 1;
        discLocator = new DiscLocator(iPlayListID);
        mediaLocator = new MediaLocator(discLocator);
        player = Manager.createPlayer(mediaLocator);
        player.perfectch();
        player.start();
    } catch(Exception e){}
    while(true){
        try{
            wait(100);
        }catch(Exception e){}
        if(player.getMediaTime().getSeconds() > 5.0f)break;
    }                                                                 ⎬ T5 try{
        iPlaylist = 2;
        discLocator = new DiscLocator(iPlayListID);
        mediaLocator = new MediaLocator(discLocator);
        player = Manager.createPlayer(mediaLocator);
        player.perfectch();
        player.start();
    } catch(Exception e){}
    while(true){
        try{
            wait(100);
        }catch(Exception e){}
        if(player.getMediaTime().getSeconds() > 5.0f)break;
    }                                                                 ⎬ T6
                                                                      ⎬ T7
    Menu();
```

```
private void exec:PlayList(int index){
    clear(0,0,1920,1080);
    try {
        iPlayListID = 3;
        discLocator = new DiscLocator(iPlayListID);
        mediaLocator = new MediaLocator(discLocator);
        player = Manager.createPlayer(mediaLocator);
        player.prefetch();
        player.start();
    }
    catch (NoPlayerException e){}
    catch (IOException e){}
    catch (InvalidLocatorException e){} timer_task = new Timer1Task();

Menu();
} public void destroyXlet(boolean arg0) throws XletStateChangeException {
} public class Timer extends TimerTask {
    public   Timer timer1;
    int iCnt = 0;

public Timer1Task(){
        Timer timer1 = new Timer();
        timer1.schedule(this, 0, 1000);
    }
    public synchronized void run() {
        iCnt++;
        if(iCnt <= 30){
            gr.drawImage(gr.decode_img( XPOS, YPOS, XPOS+128, YPOS+128, I_POS[index][0], I_POS[index][1],
                I_POS[index][2], I_POS[index][3], null);
            return;
        }
    }
}
```

T8

(X1,Y1) = (128,128)
(128,0)
(X0,Y0) = (0,0)
(0,128)
(0,256)

| 1 | 11 | 21 |
| 2 | 12 | 22 |
| 3 | 13 | 23 |
| 4 | 14 | 24 |
| 5 | 15 | 25 |
| 6 | 16 | 26 |
| 7 | 17 | 27 |
| 8 | 18 | 28 |
| 9 | 19 | 29 |
| 10 | 20 | 30 |

Scene 1

Scene 2

Scene 15

```
xxx.plst(){
    number_of_stream
    for(stream_id=0; stream_id < number_of_stream;stream_id++){
        stream_file_name;
        in_time;
        out_time;
        menu_flag;
    }
}
```

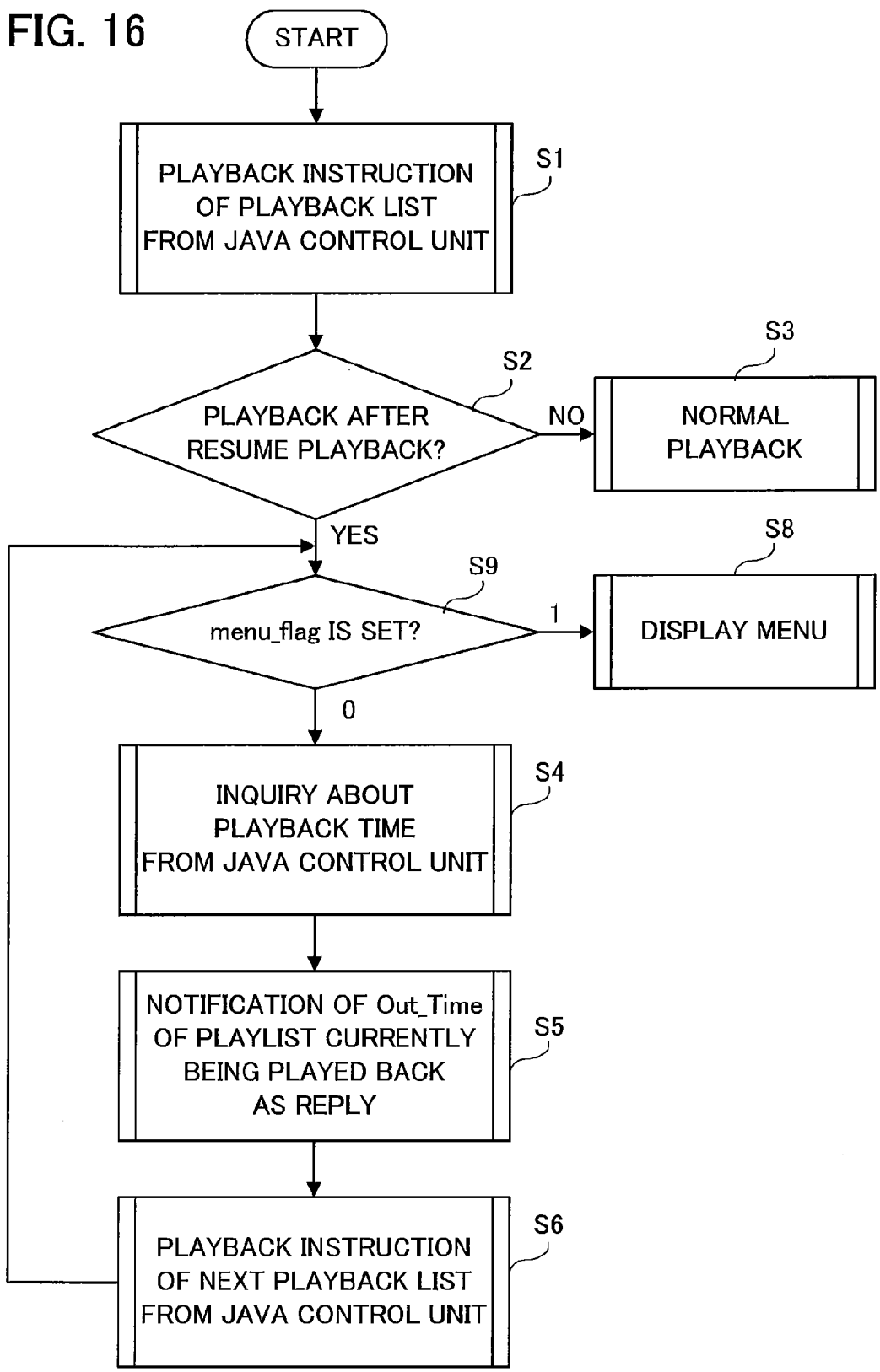

… # VIDEO INFORMATION PLAYBACK METHOD AND VIDEO INFORMATION PLAYBACK APPARATUS

TECHNICAL FIELD

The present invention relates to a recording medium, on which contents whose video playback can be controlled by a program running in a virtual machine is recorded, and a video information playback method and a video information playback apparatus for playing back video from the recording medium.

BACKGROUND ART

DVD players are known as apparatuses for playing back video contents such as movies and dramas. Navigation commands which are comparatively simple control language are used for controlling video playback in the DVD players. Meanwhile, in Blu-ray disc (BD) players which are gradually prevailing in recent years, Java virtual machines are adopted in order to make complicated and highly interactive contents viewable (see Patent Document 1). Furthermore, Java is a registered trademark (the same is true hereinafter).

PRIOR ART REFERENCE

Patent Document

Patent Document 1: Japanese Patent No. 3837427

SUMMARY OF THE INVENTION

Problem to be Solved by the Invention

Playback data of DVD includes video data, audio data, graphic data and video control data, and these data are superimposed in a single file. In a DVD player, when playback is stopped (interrupted or suspended) and then playback restart (resume playback) is operated, playback is restarted from a playback stop position after a wait time of about several seconds. In this case, because all data necessary for playback such as the video data and the audio data are superimposed in the single file, the playback can be restarted from the playback stop position by re-reading a management information file which is small in volume from a disc, and thus the wait time elapsed until the playback restart is short.

However, in playback of contents using a Java application (Java-virtual-machine-using content) from a Blu-ray disc (BD), when playback is stopped and then resume playback is operated, playback operation is performed from an initial state where the BD is inserted into a video information playback apparatus. Accordingly, the Java application program must be reactivated, so a time of several ten seconds to several minutes is required until the playback is restarted from a preceding playback stop position. In order to avoid this, there is a method in which the Java-application-using contents treated as contents which do not use Java application to shorten a time elapsed until the playback resume. However, since the Java application need be used for displaying a menu screen in a normal way, the Java application program needs to be reactivated in order to return to the menu screen, even if playback is restarted by treating the contents as the contents which do not use the Java virtual machine. Thus, there is a problem that user convenience is greatly impaired in resume playback in the BD player.

The present invention is made to solve the problem described above, and an object of the present invention is to provide a video information playback method, a video information playback apparatus and a recording medium capable of reducing a wait time required for returning to a menu screen at a time of resume playback of contents whose video playback can be controlled by a program running in a virtual machine.

Means for Solving the Problem

A video information playback method according to the present invention is a video information playback method of playing back a recording medium on which a virtual-machine-using content whose video playback can be controlled by a program running in a virtual machine is recorded, the method including:

performing simple resume playback for restarting playback of a main-program video of the virtual-machine-using content without activating the program, when the playback of the main-program video is interrupted and then a playback restart instruction is given; and skipping playback of predetermined video which is to be played back until a menu screen is displayed, when the simple resume playback of the main-program video is finished and then playback from an initial state is performed with activating the program.

Effects of the Invention

According to the video information playback method of the present invention, when simple resume playback of a main-program video is finished and then a program running in a virtual machine is activated to perform playback from an initial state, playback of predetermined video which is to be played back until a menu screen is displayed is skipped. Therefore, it is possible to reduce a wait time elapsed until the menu screen is displayed after the simple resume playback is finished.

BRIEF DESCRIPTION OF THE DRAWINGS

FIG. 8 is a diagram illustrating a source code of a Java application program.

FIG. 9 is a diagram illustrating the source code of the Java application program;

FIG. 10 is a diagram illustrating the source code of the Java application program;

FIG. 16 is a flowchart illustrating the video information playback method according to the embodiment of the present invention.

MODE FOR CARRYING OUT THE INVENTION

Figure 1:
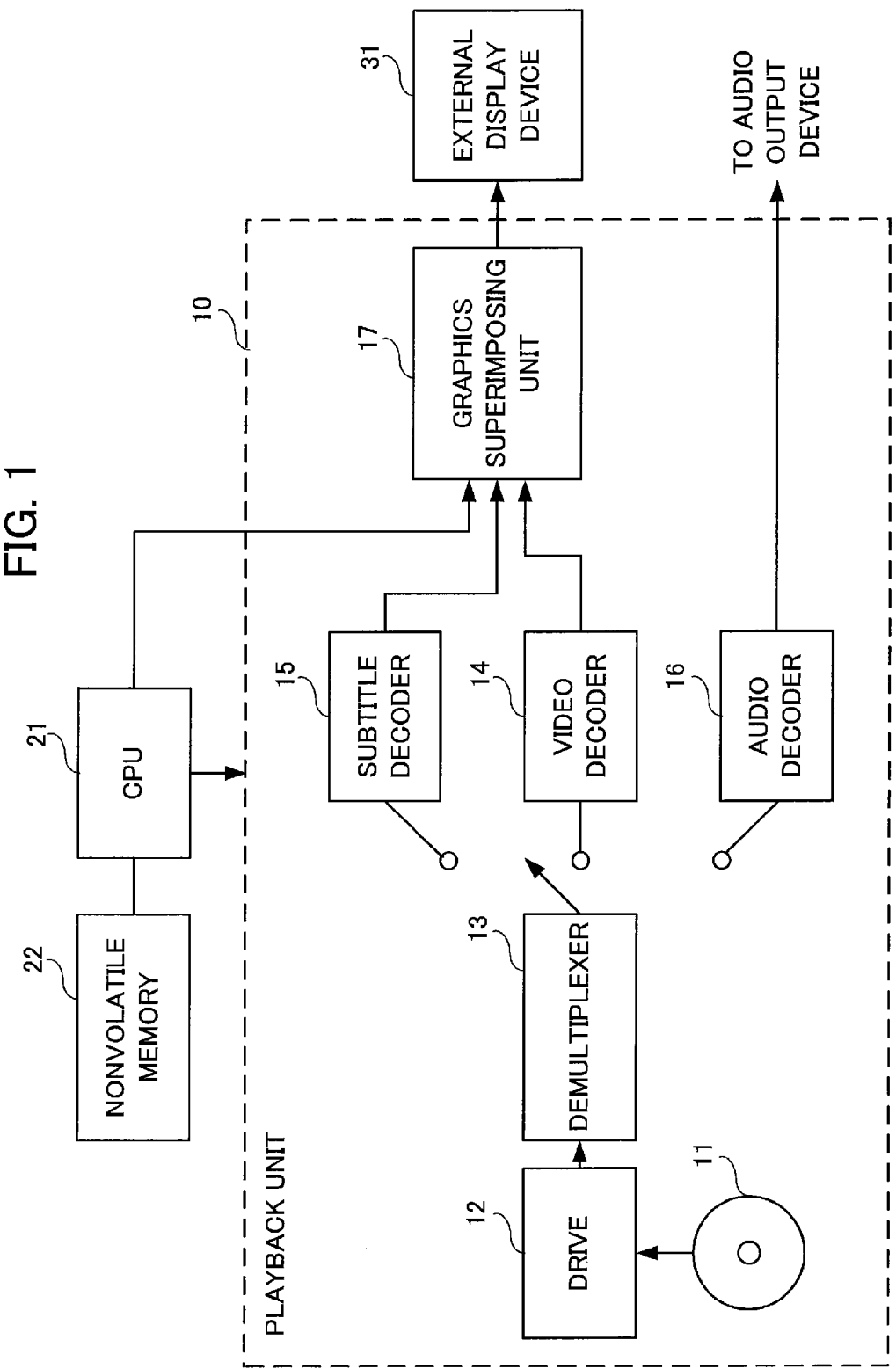
FIG. 1 is a block diagram schematically illustrating a configuration of a video information playback apparatus according to an embodiment of the present invention.

FIG. 1 is a block diagram schematically illustrating a configuration of a video information playback apparatus according to an embodiment of the present invention. The video information playback apparatus according to the present embodiment plays back a recording medium on which contents (virtual-machine-using contents) whose video playback can be controlled by an application program running in a virtual machine are recorded. Although it is conceivable that a disc on which such contents are recorded is a DVD, a CD, a Blu-ray disc or the like, a recording medium of contents may be a nonvolatile semiconductor memory. Furthermore, a description will be made as to a case where the recording medium is a Blu-ray disc (BD) and the virtual machine is a Java virtual machine in the present embodiment.

The video information playback apparatus illustrated in FIG. 1 includes a playback unit 10 for playing back an optical disc 11 (BD) which is an example of the recording medium, a CPU 21 which is a playback control means for controlling the entire apparatus and executing a Java application (a program running in the virtual machine), and a nonvolatile memory 22. A drive 12 reads out information from the optical disc 11 to output it to a demultiplexer 13. The demultiplexer 13 separates the data read out by the drive 12 into video information, audio information and subtitle graphic information. A video decoder 14 decodes the video information, a subtitle decoder 15 decodes the subtitle graphic information, and an audio decoder 16 decodes the audio information. A graphic superimposing unit 17 superimposes graphic information to be displayed by the Java application which is inputted from the CPU 21 on the decoded video information and the decoded subtitle graphic information. A video signal outputted from the graphic superimposing unit 17 is supplied to an external display device 31 and the external display device 31 displays a video. An audio signal outputted from the audio decoder 16 is sent to an audio output device (not illustrated in the drawings) and audio is outputted.

In the video information playback apparatus according to the present embodiment, when stop operation is performed during playback of a main-program video of Java-application-using contents and then resume playback is performed from a stop position, the CPU 21 restarts the playback without using the Java application, and after the completion of the playback of the main-program video, the CPU 21 activates the Java application program necessary for displaying a menu screen. In a conventional video information playback apparatus, since playback of an optical disc is performed from an initial state, a playlist of a trailer or the like is displayed until a menu screen is displayed. The video information playback apparatus according to the present embodiment is characterized in that a time elapsed until the menu screen is displayed is reduced by skipping playback of a playlist of a trailer or the like which is performed until the menu screen is displayed after the Java application program is activated.

Figures 2, 3:
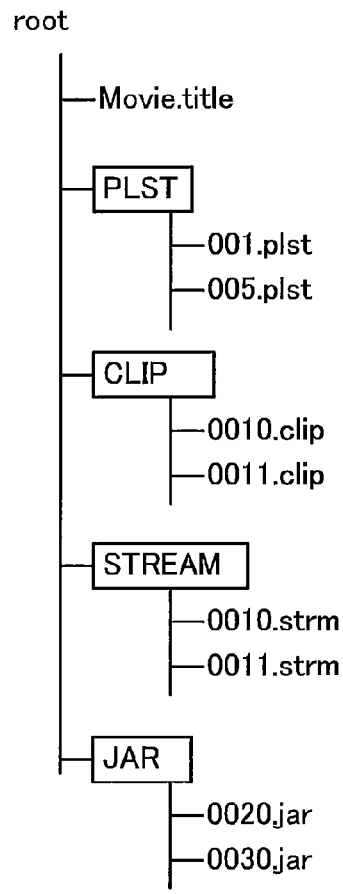
FIG. 2 is a diagram illustrating an example of structure of directories in a recording medium according to the embodiment of the present invention.
FIG. 3 is a diagram illustrating an example of syntax of a plst file.

FIG. 2 is a diagram illustrating an example of structure of files and directories which are recorded on the optical disc 11 and necessary for playing back the BD. In FIG. 2, a "Movie.title" file is a file containing information necessary for controlling a title which is a unit of playback with the highest hierarchy. In FIG. 2, "PLST" is a PLST folder which stores a file containing information necessary for playback control of a playlist (PlayList). The PLST folder has a plurality of plst files "xxx.plst", where "xxx" denotes a three-digit number. In FIG. 2, "STREAM" is a STREAM (stream) folder which stores a file necessary for playback, such as video information, audio information and graphic information. In the STREAM folder, there is a plurality of stream files "yyy.strm", where "yyy" denotes a three-digit number. The stream file is a file including a TS (transport stream) adopted in digital broadcasting and having a unique packet ID, and is a file in which video information, audio information and graphic information are superimposed. In FIG. 2, "CLIP" is a CLIP folder which stores a clip file containing information necessary for playback control of the stream file. In the CLIP folder, there is a plurality of clip files "zzz.clip", where "zzz" denotes a three-digit number. The clip file and the stream file have a one-to-one correspondence. For example, if the CLIP folder has a clip file "123.clip", the STREAM folder has a stream file "123.strm" which corresponds to the "123.clip". In FIG. 2, "JAR" is a JAR (Java Archive) folder which stores an application for title playback control running in the Java virtual machine. In the JAR folder, there is a jar file "YYY.jar" in a ZIP format file in which a set of files necessary for running the Java application is compressed, where "YYY" denotes a three-digit number.

FIG. 3 is a diagram illustrating an example of syntax of the plst file "xxx.plst" in FIG. 2. In FIG. 3, "number_of_stream" denotes total number of the stream files to be played back in a playlist (PlayList). A subsequent loop which starts from "for" is repeated the number of times indicated by the "number_of_stream". In "stream_file_name" in this loop, a file name of a stream file to be played back is described. Furthermore, in "in_time" and "out_time", a start time and an end time of a part to be played back in the stream file are described. These times are described in a PTS (Presentation Time Stamp) which is added to a packet of the stream file.

Figures 4, 5:
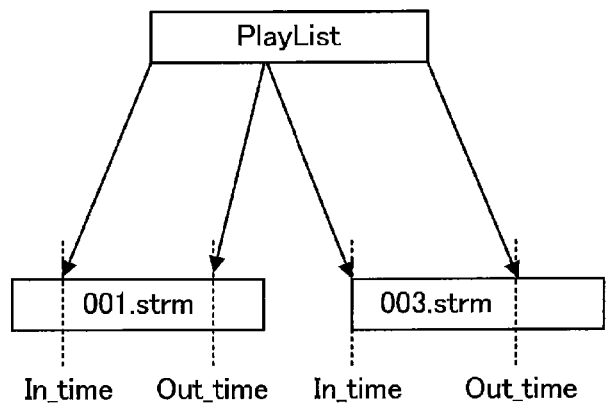
FIG. 4 is a diagram illustrating an example of a relationship between a playlist and stream files.
FIG. 5 is a diagram illustrating an example of syntax of a clip file.

FIG. 4 is a diagram illustrating an example of a relationship between a playlist (PlayList) indicated by the plst file in FIG. 2 and the stream files. When the playlist shown in FIG. 4 is played back, a part from "in_time" to "Out_time" of "001.strm" and a part from "in_time" to "Out_time" of "003.strm" are successively played back.

FIG. 5 is a diagram illustrating an example of syntax of the clip file "zzz.clip" in FIG. 2. In FIG. 5, the clip file describes information which includes superimposed information of the stream file corresponding to the clip file, such as video information and audio information, and index information necessary for random access and the like. In "stream_info( )", attribute information of the superimposed video information, audio information and graphic information are described. The "stream_info( )" does not directly relate to the present invention and so it will not be explained in detail. Further, in "index_info( )", time information and position information of a head of each GOP in the stream file are described. Total number of GOPs (Group of Picture) included in the stream file is denoted by "number_of_GOP". A subsequent loop which starts from "for" is repeated the number of times indicated by the "number_of_GOP". PTS information of an I picture at a head of a GOP is denoted "start_PTS". A relative byte number from a head of the stream file to a head of an I picture is denoted by "relative_byte".

Figures 6, 7:
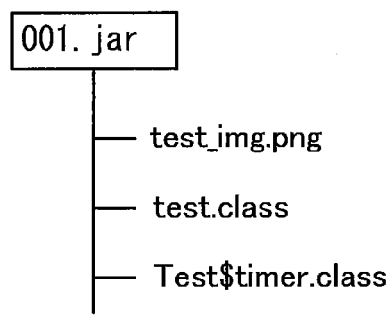
FIG. 6 is a diagram illustrating an example of syntax of a Movie.title file.
FIG. 7 is a diagram illustrating an example of structure of a jar file.

FIG. 6 is a diagram illustrating an example of syntax of the "Movie.title" file. When the optical disc 11 is inserted into the drive 12, the drive 12 firstly reads the "Movie.title" file according to control by the CPU 21. In FIG. 6, "number_of_title" denotes total number of titles recorded on the optical disc 11. A subsequent loop which starts from "for" is repeated the number of times indicated by the "number_of_title". If a title content uses a Java application, "title_type" is set to "1", and if the title content uses no Java application, it is set to "0". If the title is a title for displaying the menu screen, "title_attribute" is set to "1", and if the title is not a title for displaying the menu screen, it is set to "0". In a subsequent if-statement, a name of a jar file in which the Java application is stored is described, if the "title_type" is "1". For example, the jar file name is "123.jar". In a subsequent else-statement, a playlist file to be played back when the "title_type" is "0" is described. For example, the playlist to be played back is "123.plst". Furthermore, "title_id" to be next played back after completion of playback of a title currently being played back is described in "next_title_id".

The CPU 21 performs processing on the basis of the "Movie.title" file read from the optical disc 11 by the drive 12, according to title information described at a head. If title_type=1 and title_attribute=0 are satisfied, since the title is a title content using the Java application, the CPU 21 reads and analyzes a file (e.g., 001.jar) which stores the Java application to be used.

FIG. 7 is a diagram illustrating an example of structure of "001.jar" which corresponds to a jar file in the JAR folder in FIG. 2. In FIG. 7, the "001.jar" file is formed by three files: "test_img.png", "test.class" and "test$timer.class". The "test_img.png" is a PNG format file obtained by compressing image data used in the application. The "test.class" and the "test$timer.class" are executable files produced by compiling the Java application program into an executable format.

Operation according to the "test.class" and the "test$timer.class" will be explained below through the use of a source code before being compiled.

FIGS. 8 to 10 are diagrams illustrating a series of the source code of the "test.class" and the "test$timer.class" before being compiled. The operation of the video information playback apparatus based on the source code illustrated in FIGS. 8 to 10 will be explained below.

Figures 11A, 11B, 12:
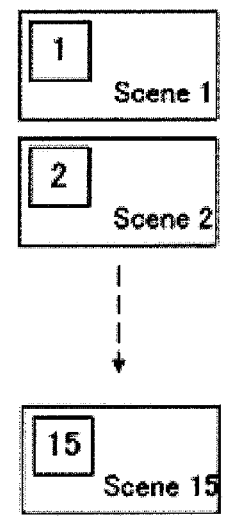
FIGS. 11A and 11B are diagrams illustrating an example of graphic images displayed by the Java application.
FIG. 12 is a diagram illustrating syntax of a plst file in relation to a video information playback method according to the embodiment of the present invention.

A T1 section of the source code illustrated in FIG. 8 is a part for importing a package necessary for executing the application. "org.disc.net.DiscLocator" is a package unique to the present embodiment which is prepared for playlist playback because playlist playback is not supported by Java. A T2 section of the source code in FIG. 8 is a part for declaring a variable. I_POS[ ][ ] and subsequent descriptions indicate coordinate information of the image data "test_img.png" displayed by using the Java application. FIGS. 11A to 11C are diagrams illustrating an example of images displayed by using the Java application. FIG. 11A is a schematic diagram illustrating "test_img.png" images, where (Xn, Yn) represents coordinate values in a memory. Here, coordinate information of {0, 0, 128, 128} in the I_POS[ ][ ] shown in the T2 section of the source code in FIG. 8 means that a square-shaped part having vertices (two vertices existing in a diagonal) whose coordinates are indicated by (X0, Y0)=(0, 0) and (X1, Y1)=(128, 128) is cut out to be displayed. That is, an image '1' in FIG. 11A is displayed. Furthermore, a displayed state of images (FIG. 11B) will be explained below.

A T3 section of the source code in FIG. 9 is a part for reading the "test_img.png" and decoding the PNG file. After the decoding is completed, the processing proceeds to a T4 section of the source code. T4 to T6 sections are parts for performing playback of a playlist (PlayList) of a trailer or the like which is to be played back until the menu screen is displayed. Furthermore, "iPlayListID" which denotes a file name of a playlist to be played back is "0" in the T4 section, so a playlist whose file name is "000.plst" is played back. Likewise, it is described that "iPlayListID=1" in the T5 section, so a playlist "001.plst" is played back; and it is described that "iPlayListID=2" in the T6 section, so a playlist "002.plst" is played back. When playback of the playlist in each of T4 to T6 sections, corresponding playlist data is read out from the optical disc 11 by the drive 12. The read data is separated into video information, audio information and subtitle graphic information by the demultiplexer 13. The video information, the audio information and the subtitle graphic information are decoded by the video decoder 14, the audio decoder 16 and the subtitle decoder 15, respectively.

Figure 14:
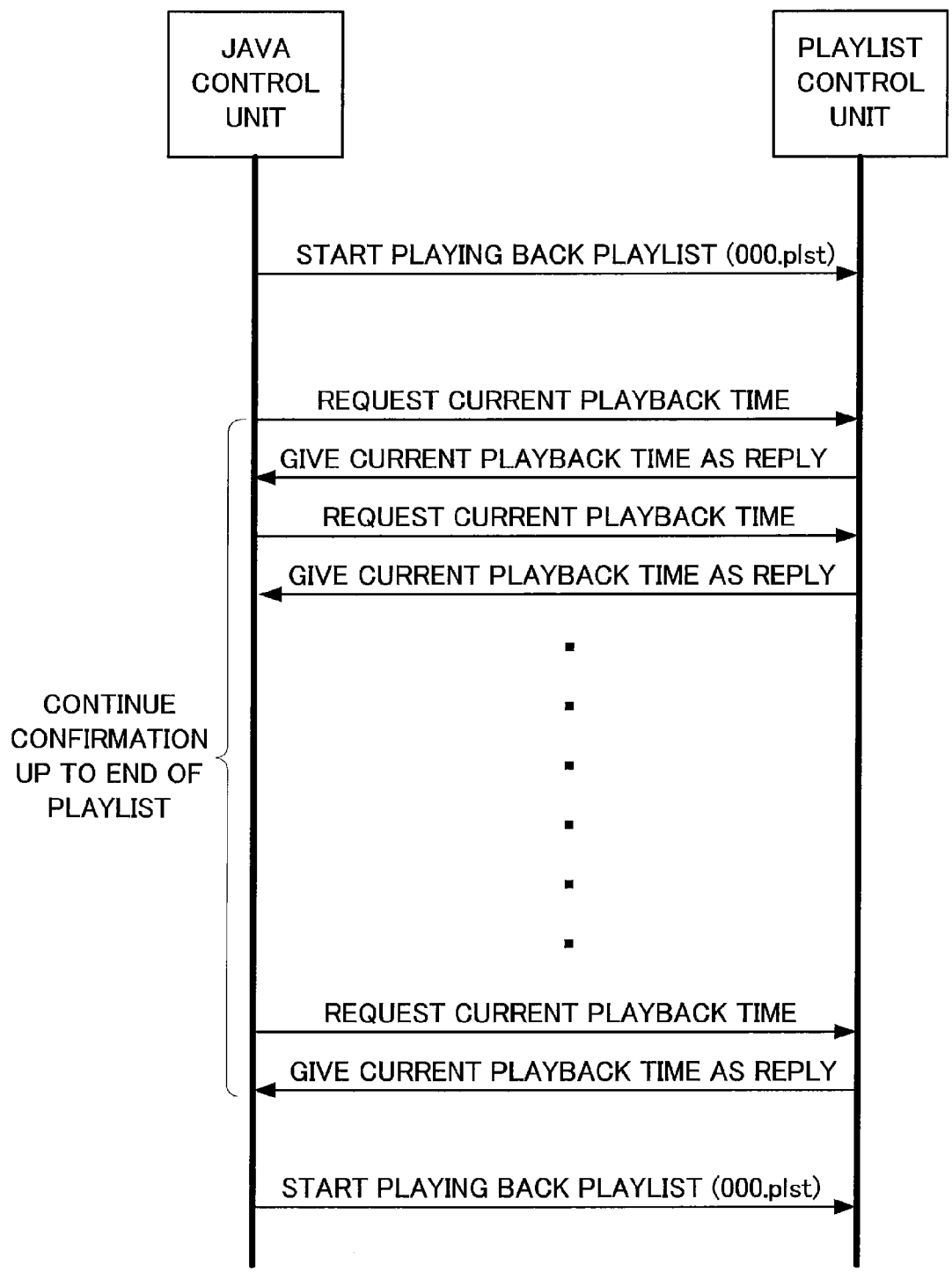
FIG. 14 is an operational sequence diagram illustrating the video information playback method according to the embodiment of the present invention.

A description will be made as to operation of the CPU 21 when the process of the T4 section is performed to control the playback of the playlist "000.plst". FIG. 14 is a diagram illustrating a communication sequence of control information in the CPU 21 between a playlist control unit and a Java control unit for controlling the Java application, when the playlist playback is controlled by the Java application. After the playback of the playlist "000.plst" is started, the Java control unit checks a playback time of the playlist "000.plst" in the playlist control unit at regular intervals. During the playlist playback, in response to a check request from the Java control unit, the playlist playback unit reports a current playback time of the playlist. If the playback time of the playlist reported by the playlist control unit agrees with a final time of the playlist "000.plst", recognizing that the playback of the playlist "000.plst" is completed, the Java control unit executes the subsequent process in the T5 section to perform playback of the playlist "001.plst" in a similar sequence.

Figure 15:
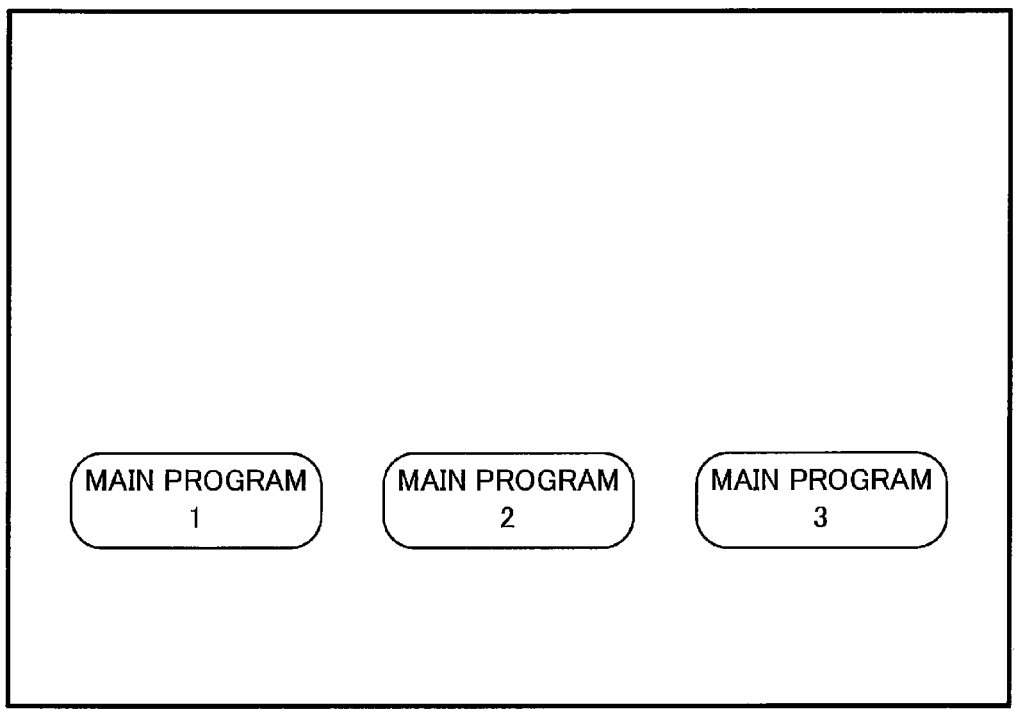
FIG. 15 is a diagram illustrating a menu screen according to the embodiment of the present invention.

A T7 section is a source code for performing a process to display the menu screen after the processes of the T4 to T6 sections are performed (after the playlist of the trailer or the like was displayed). Since the source code in the T7 section does not relate to an essence of the invention in the present application, it will not be explained in detail. FIG. 15 is a diagram illustrating the menu screen displayed as a consequence of performing the process of the T7 section. The menu screen illustrated in FIG. 15 includes three selectable buttons, and any of three main video programs can be selected to be played back. In the present embodiment, operation when leftmost "main program 1" is selected will be explained.

FIG. 10 is a diagram illustrating the source code for performing playback of a playlist which constitutes the main program 1. When the button of the "main program 1" in the menu screen is selected, a process is performed according to the source code of a T8 section in FIG. 10. The source code in the T8 section is for displaying the graphic images illustrated in FIG. 11A by using the Java application, while a playlist "003.plst" is being played back. Specifically, the images '1' to '30' illustrated in FIG. 11A are superimposed on a playlist video specified by the "003.plst" and displayed every second as illustrated in FIG. 11B, for example. At this time, graphic screens '1' to '30' generated by the CPU 21, an output screen of the video decoder 14 and an output screen of the subtitle decoder 15 are superimposed by the graphic superimposing unit 17, and an image signal of the superimposed image is outputted to the external display device 31.

Thus, by using the Java application, complicated video playback can be achieved, e.g., various graphic images are simultaneously displayed on a main-program video. The Java application program is written, as in the T3 section, so as to decode a PNG file used for displaying a graphic image before playback starts. It is because that a decoding process for decoding PNG data or JPEG data is a process having a very heavy load for a CPU which is a device exclusive to playback, and graphics cannot be smoothly displayed when the decoding is performed while the Java application program is executed. For this reason, there is a wait time of several ten seconds to several minutes from a user's instruction to start playback until a decoding of a PNG file or the like is completed and a playback video is actually displayed.

Next, a description will be made as to a problem caused when playback of a Java-application-using content is interrupted and then the resume playback is performed. For example, if the playback is interrupted at the time of displaying '15' in FIG. 11A, it is necessary to save, in a nonvolatile memory such as a flash memory, the whole of a state of the CPU 21 and information in an external memory (RAM) for the CPU 21 at the time of displaying '15', in order to perform the resume playback from the time of displaying '15'. However, a consumer apparatus configured by minimum hardware equipment for realizing a video playback function cannot adopt such a configuration. For this reason, when the playback is resumed by using the Java application, the processes in the T1 to T3 sections are performed again and the playback is restarted from a head of a playlist (a display screen of '1'), and thus user convenience is greatly impaired.

In order to cope with the problem described above, the video information playback apparatus according to the present embodiment performs simple resume playback for restarting playback by treating a playlist as a playlist which does not use the Java application, without activating the Java application. Thereby, it is possible to restart playback quickly. In this case, since the Java application is not activated, display of the graphics '1' to '30' is not performed, but video and audio are played back. In a case of a commonly commercial movie software, even if the Java application is not activated, video, audio and subtitle can be displayed and it is enough to understand the content, notwithstanding functions are partially limited.

When playback of a main-program video is completed by means of the simple resume playback, a process for returning to the menu screen illustrated in FIG. 15 is performed. In order to display the menu screen normally, it is necessary to activate the Java application. So, for displaying the menu screen, the processes described in the T1 to T3 sections are performed again and playback operation is performed from an initial state, i.e., a state immediately after the optical disc 11 is inserted into the video information playback apparatus. In this case, the three playlists "000.plst", "001.plst" and "002.plst" which are playlists of trailers or the like played back until the menu screen is displayed are played back again until the menu screen is displayed. In some optical discs, a playback time for such a playlist is 2 to 3 minutes if it is short, or more than 10 minutes if it is long. For this reason, when the simple resume playback is performed, there is a problem that waiting for several minutes or more than 10 minutes under some circumstances is needed, after playback of a main-program video is completed subsequent to the resume playback until a transition to a menu screen.

Figure 13:
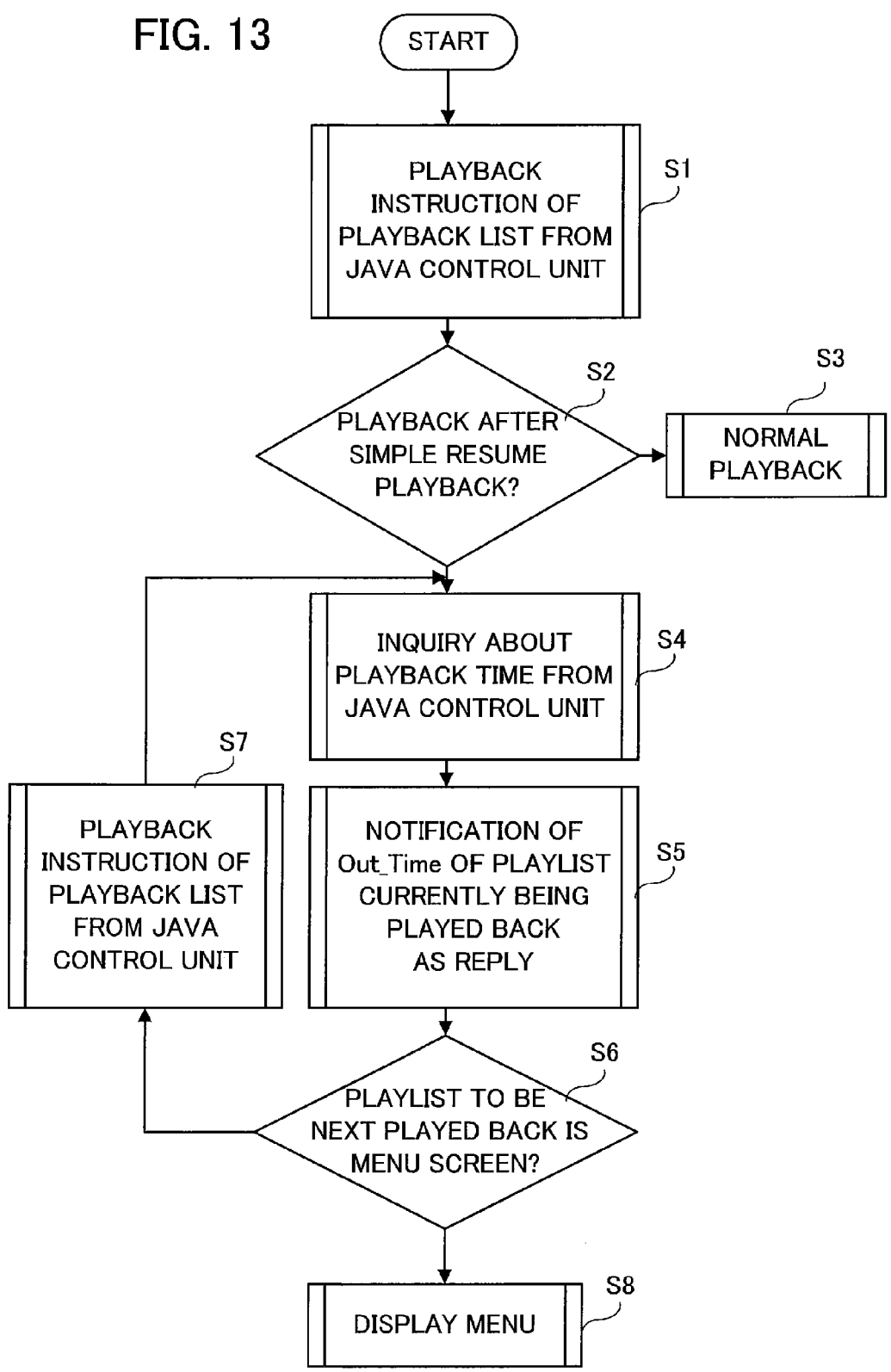
FIG. 13 is a flowchart illustrating the video information playback method according to the embodiment of the present invention.

An explanation will be made below as to playback operation in the video information playback apparatus according to the present embodiment after the playback of the main-program video is completed by means of the simple resume playback until the Java application is activated and the menu screen is displayed. FIG. 13 is a flowchart of playback control performed for skipping the playback of the playlists of the trailers or the like which are played back after the simple resume playback until the Java application is activated and the menu screen is displayed. When the processes from the T1 to T3 sections (Java application activating process) are completed and an instruction to playback the playlist "000.plst" is given to the playlist control unit according to the T4 section (step S1), the CPU 21 judges whether or not to be playback after the simple resume playback where the Java application program is not activated (step S2). If it is judged not to be playback after the simple resume playback in step S2, the playlist "000.plst" is played back as usual (step S3). Otherwise, if it is judged to be playback after the simple resume playback, the processing proceeds to step S4 and an inquiry about a current playback time to be sent is received from the Java control unit in the CPU 21. Whereas the playlist control unit in the CPU 21 notifies the Java control unit of the current playback time in an ordinal case, the playlist control unit notifies the Java control unit of a playback end time described in "Out_time" of the "001.plst" (step S5) in order to skip the playback of the "000.plst". Since time information in "Out_time" indicating the playback end time is notified from the playlist control unit, the Java control unit recognizes that the playback of the "000.plst" is completed and the processing proceeds to the process in the T5 section of the source code for playing back the next playlist "001.plst".

Since the process of the T5 section is to perform playback of a playlist "001.mpls", the processing proceeds from step 6 to step 7 and an instruction to playback the playlist "001.mpls" is given from the Java control unit (step S7). After that, in response to the inquiry about the playback time from the Java control unit in step S4, the playback end time "Out_time" of the playlist "001.plst" is notified in step S5, and thereby the playback of the playlist "001.mpls" is skipped. Likewise, in a process of the T6 section to be next performed, a playback end time "Out_time" of the playlist "002.plst" is notified, and thereby playback of the playlist is skipped and the processing proceeds to a process in the T7 section. Since the process in the T7 section is to display the menu screen, the processing proceeds to step S8 to display the menu screen illustrated in FIG. 15.

As described above, when the playback of the playlists of the trailers or the like which are played back until the menu screen is displayed is performed after the simple resume playback is performed without activating the Java application program, the playback end time "Out_time" is notified in response to the inquiry from the Java control unit about the playback time of each of the playlists to be played back, and thereby it is possible to reduce a wait time elapsed until the menu screen is displayed.

FIG. 12 illustrates modified syntax of a playlist for skipping playback of a specified playlist out of playlists which are to be played back until the menu screen is displayed after playback of a main-program video is completed by means of simple resume playback in the video information playback apparatus according to the present embodiment. A difference from the playlist illustrated in FIG. 3 is that "menu_flag" is added. The "menu.flag" is a flag for identifying a playlist whose playback may be or can be skipped after the simple resume playback, out of the playlists which are to be played back until the menu screen is displayed after the Java application program is activated. The "menu.flag" is set to be "0" if it is a playlist whose playback can be skipped; and it is set to be "1" if it is a playlist whose playback should not be skipped.

FIG. 16 is a flowchart illustrating a playback operation until the menu screen is displayed when the "menu_flag" is added to a playlist and the simple resume playback is performed. The Java control unit gives the playlist control unit an instruction to playback the playlist in step S6, and then the CPU 21 checks a value of the "menu_flag" (step S9). If "menu_flag"=0, the processing proceeds to step S4 and an inquiry about a current playback time sent from the Java control unit is received. The playlist control unit notifies the Java control unit of "Out_time" indicating a playback end time of the playlist which is currently played back (step S6). If it is judged that "menu_flag"=1 in step S9, it is judged to be a playlist of the menu screen which is to be played back, and playlist playback is performed for displaying the menu screen in step S8.

As described above, it is possible to skip playback of only a specific playlist whose playback can be skipped, by adding the "menu_flag" to the syntax of the playlist, wherein the "menu_flag" is for identifying which playlist is a playlist whose playback can be skipped out of playlists to be played back after the Java application program is activated until the menu screen is displayed.

EXPLANATION OF REFERENCE CHARACTERS

10 playback unit; 11 optical disc (recording medium); 12 drive; 13 demultiplexer; 14 video decoder; 15 subtitle decoder; 16 audio decoder; 17 graphic superimposing unit; 21 CPU (playback control means); 22 nonvolatile memory; 31 external display device.

What is claimed is:

1. A video information playback method of playing back a recording medium on which a virtual-machine-using content whose video playback can be controlled by a program running in a virtual machine is recorded, the method comprising: executing by a computer processor a process comprising:
    performing simple resume playback for restarting playback of a main-program video of the virtual-machine-using content without activating the program, when the playback of the main-program video is interrupted and then a playback restart instruction is given; and
    skipping playback of predetermined video which is to be played back until a menu screen is displayed, when the simple resume playback of the main-program video is finished and then playback from an initial state is performed with activating the program, wherein a playlist file, which specifies the predetermined video which is to be played back until the menu screen is displayed, has a flag for identifying whether playback of the predetermined video can be skipped or not when playback is performed with activating the program after the simple resume playback, and the playback of the predetermined video is skipped on the basis of the flag.

2. The method according to claim 1, wherein the playback of the predetermined video is skipped by notifying a playback control means of time information indicating a playback finish point of the predetermined video which is to be played back until the menu screen is displayed, when playback is performed from an initial state with activating the program after the simple resume playback.

3. A video information playback apparatus comprising:
    a playback unit for playing back a recording medium on which a virtual-machine-using content is recorded; and
    a computer processor programmed to execute a program running in a virtual machine in order to control said playback unit to:
    perform simple resume playback for restarting playback of a main-program video of the virtual-machine-using content without activating the program, when the playback of the main-program video is interrupted and then a playback resume instruction is given; and
    skip playback of predetermined video which is to be played back until a menu screen is displayed, when the simple resume playback of the main-program video is finished and then playback is performed from an initial state with activating the program,
    wherein a playlist file, which specifies the predetermined video which is to be played back until the menu screen is displayed, has a flag for identifying whether playback of the predetermined video can be skipped or not when playback is performed with activating the program after the simple resume playback, and the playback of the predetermined video is skipped on the basis of the flag.

4. The video information playback apparatus according to claim 3, wherein the playback of the predetermined video is skipped by notifying a playback control means of time information indicating a playback finish point of the predetermined video which is to be played back until the menu screen is displayed, when playback is performed from an initial state with activating the program after the simple resume playback.

* * * * *